(12) United States Patent
Torgersrud et al.

(10) Patent No.: US 10,278,071 B2
(45) Date of Patent: *Apr. 30, 2019

(54) MOBILE DEVICE-BASED COMMUNITY CORRECTIONS SUPERVISION SYSTEM

(71) Applicant: INTELMATE LLC, San Francisco, CA (US)

(72) Inventors: Richard Torgersrud, San Francisco, CA (US); Curt Clifton, Annapolis, MD (US); Christopher Ditto, San Jose, CA (US); Brendan Hyland, San Francisco, CA (US)

(73) Assignee: INTELMATE LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,381

(22) Filed: Jul. 10, 2017

(65) Prior Publication Data

US 2017/0311162 A1   Oct. 26, 2017

Related U.S. Application Data

(63) Continuation of application No. 14/664,460, filed on Mar. 20, 2015, now Pat. No. 9,706,403.

(60) Provisional application No. 61/969,092, filed on Mar. 22, 2014.

(51) Int. Cl.
| | |
|---|---|
| *H04W 12/06* | (2009.01) |
| *G06F 21/32* | (2013.01) |
| *H04L 29/08* | (2006.01) |
| *H04W 4/021* | (2018.01) |
| *H04W 12/08* | (2009.01) |
| *H04L 29/06* | (2006.01) |

(52) U.S. Cl.
CPC ............ *H04W 12/06* (2013.01); *G06F 21/32* (2013.01); *H04L 67/18* (2013.01); *H04W 4/021* (2013.01); *H04W 12/08* (2013.01); *H04L 63/0861* (2013.01); *H04L 63/107* (2013.01)

(58) Field of Classification Search
CPC ....... H04W 12/06; H04W 4/021; G06F 21/32; H04M 11/04; H04M 2242/04; H04M 3/5116; H04M 1/72522; H04M 1/72572; H04M 1/72536; H04M 2250/02; H04M 15/83; H04M 15/84; H04M 2215/815; H04N 21/4182; H04N 2201/3226

See application file for complete search history.

(56) References Cited

U.S. PATENT DOCUMENTS

| | | | |
|---|---|---|---|
| 8,041,342 B2 * | 10/2011 | Chang | ..................... H04L 51/24 |
| | | | 379/88.12 |
| 2003/0126243 A1 | 7/2003 | Kudo et al. | |
| 2010/0094997 A1 | 4/2010 | Chou | |
| 2014/0055553 A1 | 2/2014 | Lee et al. | |
| 2014/0313031 A1 | 10/2014 | Gupta | |

* cited by examiner

*Primary Examiner* — Kabir A Timory
(74) *Attorney, Agent, or Firm* — Jeffri A. Kaminski Venable LLP

(57) ABSTRACT

An exemplary embodiment provides for a method for providing a mobile device-based community corrections supervision system. The method includes receiving an alert, from a remote server, via an enrollee's mobile device, to perform a check-in and receiving acknowledgement of the alert from the enrollee. Additionally, the method then requests the enrollee to recite displayed text and records the enrollee as the displayed text is recited.

56 Claims, 21 Drawing Sheets

MOBILE DEVICE-BASED COMMUNITY CORRECTIONS SUPERVISION SYSTEM

CROSS-REFERENCE TO RELATED APPLICATIONS

This application is a continuation of U.S. patent application Ser. No. 14/664,460, now issued as U.S. Pat. No. 9,706,403, filed Mar. 20, 2015, which claims the benefit of priority of U.S. Provisional Patent Application Ser. No. 61/969,092, filed on Mar. 22, 2014, the entire contents of which are hereby incorporated by reference.

BACKGROUND

Probation and parole programs are meant as a means to keep tabs on those who need a level of supervision which is typically not as stringent as being incarcerated. Typically, supervision methods that attempt to fill this need may include assignment to a case manager with whom a probationer, or parolee, is required to check-in with. Check-ins may involve voice phone calls, to or from the case manager, and also perhaps scheduled in-person check-ins as well as un-scheduled surprise visits by the case manager at a location that the person, subject to supervision, is supposed to be. One example could be being at a halfway house at a certain time of day.

In practice, however, case managers often are burdened with more persons to supervise than they can effectively manage. Additionally, there can be legitimate situations that may prevent a person from being able to check-in with their case manager. When they occur, though, it may prove difficult to legitimately account the situation to a case manager due to lack of corroborating evidence.

In an attempt to overcome some of the aforementioned situations, and/or in cases that require perhaps more stringent supervision, electronic monitoring devices in the form of hard-to-remove bracelets or anklets are often employed. These devices are not without problems, however. These problems include, but not limited to, device failure, they have been numerous situations of successful removal, are often seen as impediment for re-integration into society as they are sometimes noticeable and a case manager may still be overburdened with too many cases to effectively manage.

Due to these deficiencies, and perhaps other ones, there is a need for improved probation and parole supervision systems.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

An exemplary embodiment provides for a method for providing a mobile device-based community corrections supervision system. The method includes receiving an alert, from a remote server, via an enrollee's mobile device, to perform a check-in and receiving acknowledgement of the alert from the enrollee. Additionally, the method then requests the enrollee to recite displayed text and records the enrollee as the displayed text is recited.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

FIGS. 13-21 are example screenshots illustrating an example application that may be utilized management of enrollees utilizing the mobile application described via FIGS. 4-12.

DETAILED DESCRIPTION

The claimed embodiments provide for a mobile device-based supervision system wherein enrollees are subject to random check-in requests wherein the check-ins include audiovisual recordation of the enrollee reciting text displayed on their mobile device within a prescribed time limit. While some check-ins may be manually-scheduled, an automatic, random scheduling provides for easy post check-in performance for both an enrollee and their case manager. The claimed embodiments also produce a clear performance record devoid of possible personal prejudice a case manager may inject into performance reports produced via prior art supervision systems. Furthermore, the claimed embodiments also provide for enrollees to put in extra compliance if they choose to, be it for perhaps a missed check-in and/or if they want to demonstrate their commitment to not be on a path to possible recidivation. Still further, the claimed embodiments also allow for case managers to effectively supervise a larger number of enrollees than what prior art systems allowed.

Exemplary methods for utilizing the claimed embodiments will be further described in a later section, specifically via FIGS. 4-21. Firstly, though, FIGS. 1-3 will be presented which describe example devices that may be utilized to implement the claimed embodiments.

Figure 1:
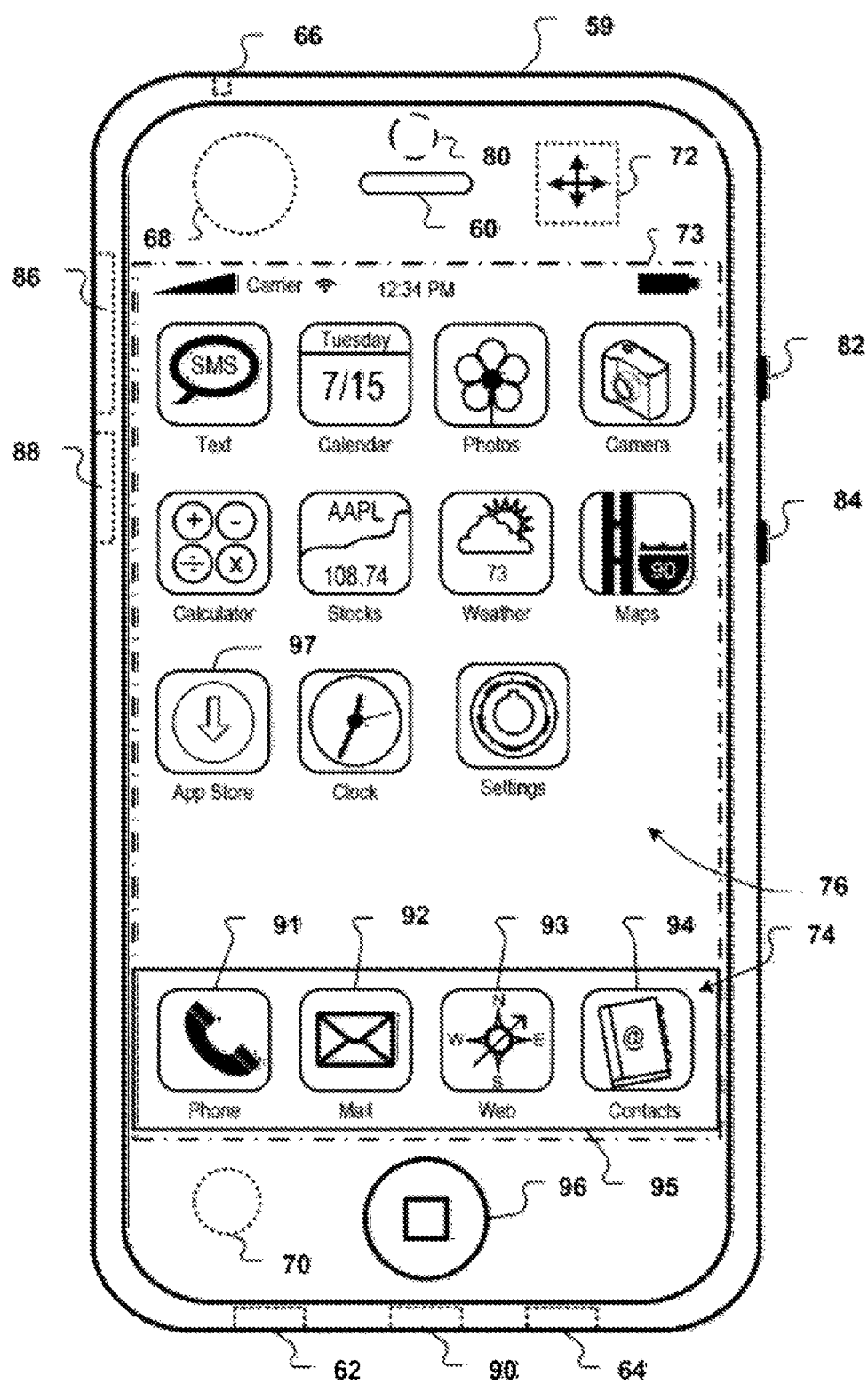
FIGS. 1-2 are schematic diagrams of an example mobile device that may be used in conjunction with the claimed embodiments.
Figure 2:
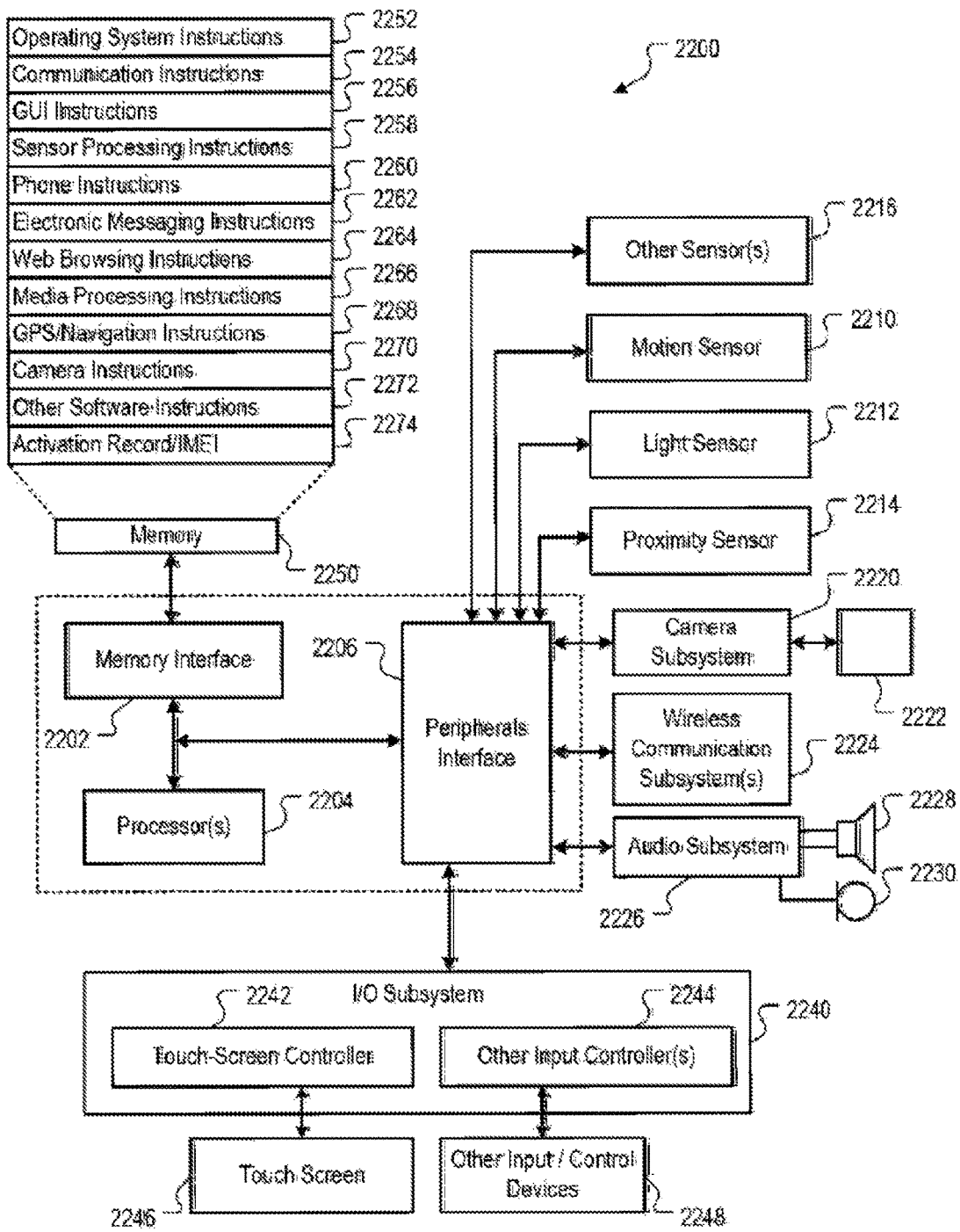

FIGS. 1-2 are schematic diagrams of an example mobile device 59 that may be used in conjunction with the claimed embodiments. The mobile device 59 can be, for example, a personal digital assistant, a cellular telephone, a network appliance, a camera, a smart phone, an enhanced general packet radio service (EGPRS) mobile phone, a network base station, a media player, a navigation device, an email device, a game console, or a combination of any two or more of these data processing devices or other data processing devices.

In some implementations, the mobile device 59 includes a touch-sensitive display 73. The touch-sensitive display 73 can implement liquid crystal display (LCD) technology, light emitting polymer display (LPD) technology, or some other display technology. The touch-sensitive display 73 can be sensitive to haptic and/or tactile contact with a user.

In some implementations, the touch-sensitive display 73 can comprise a multi-touch-sensitive display 73. A multi-touch-sensitive display 73 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device.

In some implementations, the mobile device 59 can display one or more graphical user interfaces on the touch-sensitive display 73 for providing the user access to various system objects and for conveying information to the user. In some implementations, the graphical user interface can include one or more display objects 74, 76. In the example shown, the display objects 74, 76, are graphic representations of system objects. Some examples of system objects include device functions, applications, windows, files, alerts, events, or other identifiable system objects.

In some implementations, the mobile device 59 can implement multiple device functionalities, such as a telephony device, as indicated by a phone object 91; an e-mail device, as indicated by the e-mail object 92; a network data communication device, as indicated by the Web object 93; a Wi-Fi base station device (not shown); and a media processing device, as indicated by the media player object 94. In some implementations, particular display objects 74, e.g., the phone object 91, the e-mail object 92, the Web object 93, and the media player object 94, can be displayed in a menu bar 95. In some implementations, device functionalities can be accessed from a top-level graphical user interface, such as the graphical user interface illustrated in the figure. Touching one of the objects 91, 92, 93 or 94 can, for example, invoke corresponding functionality.

In some implementations, the mobile device 59 can implement network distribution functionality. For example, the functionality can enable the user to take the mobile device 59 and its associated network while traveling. In particular, the mobile device 59 can extend Internet access (e.g., Wi-Fi) to other wireless devices in the vicinity. For example, mobile device 59 can be configured as a base station for one or more devices. As such, mobile device 59 can grant or deny network access to other wireless devices.

In some implementations, upon invocation of device functionality, the graphical user interface of the mobile device 59 changes, or is augmented or replaced with another user interface or user interface elements, to facilitate user access to particular functions associated with the corresponding device functionality. For example, in response to a user touching the phone object 91, the graphical user interface of the touch-sensitive display 73 may present display objects related to various phone functions; likewise, touching of the email object 92 may cause the graphical user interface to present display objects related to various e-mail functions; touching the Web object 93 may cause the graphical user interface to present display objects related to various Web-surfing functions; and touching the media player object 94 may cause the graphical user interface to present display objects related to various media processing functions.

In some implementations, the top-level graphical user interface environment or state can be restored by pressing a button 96 located near the bottom of the mobile device 59. In some implementations, each corresponding device functionality may have corresponding "home" display objects displayed on the touch-sensitive display 73, and the graphical user interface environment can be restored by pressing the "home" display object.

In some implementations, the top-level graphical user interface can include additional display objects 76, such as a short messaging service (SMS) object, a calendar object, a photos object, a camera object, a calculator object, a stocks object, a weather object, a maps object, a notes object, a clock object, an address book object, a settings object, and an app store object 97. Touching the SMS display object can, for example, invoke an SMS messaging environment and supporting functionality; likewise, each selection of a display object can invoke a corresponding object environment and functionality.

Additional and/or different display objects can also be displayed in the graphical user interface. For example, if the device 59 is functioning as a base station for other devices, one or more "connection" objects may appear in the graphical user interface to indicate the connection. In some implementations, the display objects 76 can be configured by a user, e.g., a user may specify which display objects 76 are displayed, and/or may download additional applications or other software that provides other functionalities and corresponding display objects.

In some implementations, the mobile device 59 can include one or more input/output (I/O) devices and/or sensor devices. For example, a speaker 60 and a microphone 62 can be included to facilitate voice-enabled functionalities, such as phone and voice mail functions. In some implementations, an up/down button 84 for volume control of the speaker 60 and the microphone 62 can be included. The mobile device 59 can also include an on/off button 82 for a ring indicator of incoming phone calls. In some implementations, a loud speaker 64 can be included to facilitate hands-free voice functionalities, such as speaker phone functions. An audio jack 66 can also be included for use of headphones and/or a microphone.

In some implementations, a proximity sensor 68 can be included to facilitate the detection of the user positioning the mobile device 59 proximate to the user's ear and, in response, to disengage the touch-sensitive display 73 to prevent accidental function invocations. In some implementations, the touch-sensitive display 73 can be turned off to conserve additional power when the mobile device 59 is proximate to the user's ear.

Other sensors can also be used. For example, in some implementations, an ambient light sensor 70 can be utilized to facilitate adjusting the brightness of the touch-sensitive display 73. In some implementations, an accelerometer 72 can be utilized to detect movement of the mobile device 59, as indicated by the directional arrows. Accordingly, display objects and/or media can be presented according to a detected orientation, e.g., portrait or landscape. In some implementations, the mobile device 59 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 59 or provided as a separate device that can be coupled to the mobile device 59 through an interface (e.g., port device 90) to provide access to location-based services.

The mobile device 59 can also include a camera lens and sensor 80. In some implementations, the camera lens and sensor 80 can be located on the back surface of the mobile device 59. The camera can capture still images and/or video.

The mobile device 59 can also include one or more wireless communication subsystems, such as an 802.11b/g/n communication device 86, and/or a BLUETOOTH communication device 88. Other communication protocols can also be supported, including other 802.x communication protocols (e.g., WiMax, Wi-Fi, 3G, LTE), code division multiple access (CDMA), global system for mobile communications (GSM), Enhanced Data GSM Environment (EDGE), etc.

In some implementations, the port device 90, e.g., a Universal Serial Bus (USB) port, or a docking port, or some other wired port connection, is included. The port device 90 can, for example, be utilized to establish a wired connection to other computing devices, such as other communication devices 59, network access devices, a personal computer, a printer, or other processing devices capable of receiving and/or transmitting data. In some implementations, the port device 90 allows the mobile device 59 to synchronize with a host device using one or more protocols, such as, for example, the TCP/IP, HTTP, UDP and any other known protocol. In some implementations, a TCP/IP over USB protocol can be used.

FIG. 2 is a block diagram 2200 of an example implementation of the mobile device 59. The mobile device 59 can include a memory interface 2202, one or more data processors, image processors and/or central processing units 2204, and a peripherals interface 2206. The memory interface 2202, the one or more processors 2204 and/or the peripherals interface 2206 can be separate components or can be integrated in one or more integrated circuits. The various components in the mobile device 59 can be coupled by one or more communication buses or signal lines.

Sensors, devices and subsystems can be coupled to the peripherals interface 2206 to facilitate multiple functionalities. For example, a motion sensor 2210, a light sensor 2212, and a proximity sensor 2214 can be coupled to the peripherals interface 2206 to facilitate the orientation, lighting and proximity functions described above. Other sensors 2216 can also be connected to the peripherals interface 2206, such as a positioning system (e.g., GPS receiver), a temperature sensor, a biometric sensor, or other sensing device, to facilitate related functionalities.

A camera subsystem 2220 and an optical sensor 2222, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2224, which can include radio frequency receivers and transmitters and/or optical (e.g., infrared) receivers and transmitters. The specific design and implementation of the communication subsystem 2224 can depend on the communication network(s) over which the mobile device 59 is intended to operate. For example, a mobile device 59 may include communication subsystems 2224 designed to operate over a GSM network, a GPRS network, an EDGE network, a Wi-Fi or WiMax network, and a BLUETOOTH network. In particular, the wireless communication subsystems 2224 may include hosting protocols such that the device 59 may be configured as a base station for other wireless devices.

An audio subsystem 2226 can be coupled to a speaker 2228 and a microphone 2230 to facilitate voice-enabled functions, such as voice recognition, voice replication, digital recording, and telephony functions.

The I/O subsystem 2240 can include a touch screen controller 2242 and/or other input controller(s) 2244. The touch-screen controller 2242 can be coupled to a touch screen 2246. The touch screen 2246 and touch screen controller 2242 can, for example, detect contact and movement or break thereof using any of multiple touch sensitivity technologies, including but not limited to capacitive, resistive, infrared, and surface acoustic wave technologies, as well as other proximity sensor arrays or other elements for determining one or more points of contact with the touch screen 2246.

The other input controller(s) 2244 can be coupled to other input/control devices 2248, such as one or more buttons, rocker switches, thumb-wheel, infrared port, USB port, and/or a pointer device such as a stylus. The one or more buttons (not shown) can include an up/down button for volume control of the speaker 2228 and/or the microphone 2230.

In one implementation, a pressing of the button for a first duration may disengage a lock of the touch screen 2246; and a pressing of the button for a second duration that is longer than the first duration may turn power to the mobile device 59 on or off. The user may be able to customize a functionality of one or more of the buttons. The touch screen 2246 can, for example, also be used to implement virtual or soft buttons and/or a keyboard.

In some implementations, the mobile device 59 can present recorded audio and/or video files, such as MP3, MC, and MPEG files. In some implementations, the mobile device 59 can include the functionality of an MP3 player. The mobile device 59 may, therefore, include a 32-pin connector that is compatible with the MP3 player. Other input/output and control devices can also be used.

The memory interface 2202 can be coupled to memory 2250. The memory 2250 can include high-speed random access memory and/or non-volatile memory, such as one or more magnetic disk storage devices, one or more optical storage devices, and/or flash memory (e.g., NAND, NOR). The memory 2250 can store an operating system 2252, such as Darwin, RTXC, LINUX, UNIX, OS X, ANDROID, iOS, WINDOWS, or an embedded operating system such as VxWorks. The operating system 2252 may include instructions for handling basic system services and for performing hardware dependent tasks. In some implementations, the operating system 2252 can be a kernel (e.g., UNIX kernel).

The memory 2250 may also store communication instructions 2254 to facilitate communicating with one or more additional devices, one or more computers and/or one or more servers. The memory 2250 may include graphical user interface instructions 2256 to facilitate graphic user interface processing including presentation, navigation, and selection within an application store; sensor processing instructions 2258 to facilitate sensor-related processing and functions; phone instructions 2260 to facilitate phone-related processes and functions; electronic messaging instructions 2262 to facilitate electronic-messaging related processes and functions; web browsing instructions 2264 to facilitate web browsing-related processes and functions; media processing instructions 2266 to facilitate media processing-related processes and functions; GPS/Navigation instructions 2268 to facilitate GPS and navigation-related processes and instructions; camera instructions 2270 to facilitate camera-related processes and functions; and/or other software instructions 2272 to facilitate other processes and functions.

Figure 3:
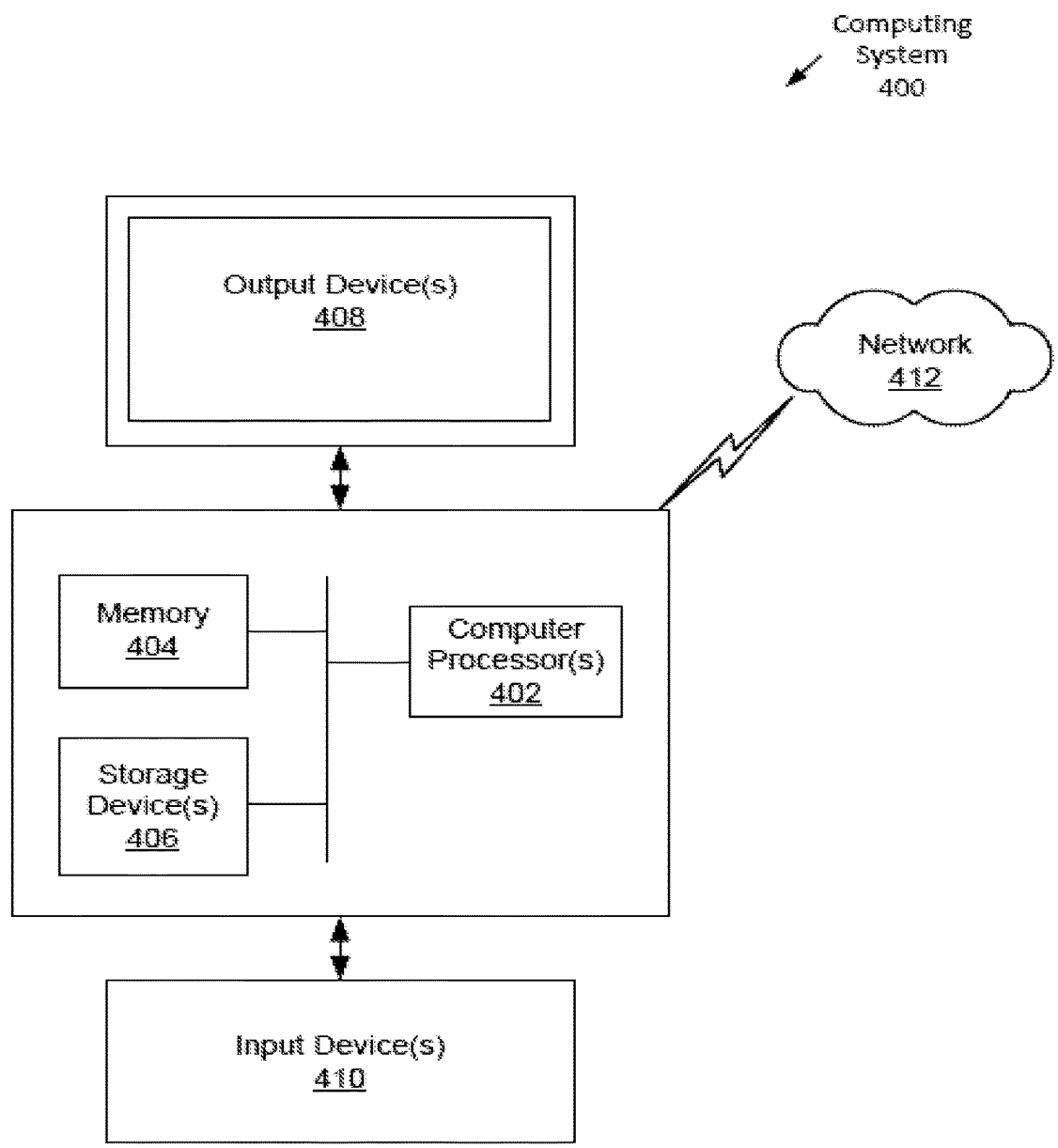
FIG. 3 is a schematic diagram of a computer system that may be used in conjunction with the claimed embodiments.

Each of the above identified instructions and applications can correspond to a set of instructions for performing one or more functions described above. These instructions need not be implemented as separate software programs, procedures or modules. The memory 2250 can include additional instructions or fewer instructions. Furthermore, various functions of the mobile device 59 may be implemented in hardware and/or in software, including in one or more signal processing and/or application, FIG. 3 is a schematic diagram of a computer system that may be used in conjunction with the claimed embodiments, As shown in FIG. 3, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, camera, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In at least one implementation of the claimed embodiments, the node corresponds to a distinct computing device. Alternatively, the node may correspond to a computer processor with associated physical memory. The node may alternatively correspond to a computer processor or micro-core of a computer processor with shared memory and/or resources.

Now that example devices have been described upon which the claimed embodiments may be implemented, those claimed embodiments will now be further described beginning with FIGS. 4-11 which describe an example check-in of an enrollee of a supervision system via a mobile device, such as the mobile device 59 shown in FIG. 1. Specifically, FIGS. 4-11 are example screenshots illustrating an implementation of a mobile device app that may be used as part of a supervision system.

Figure 4:
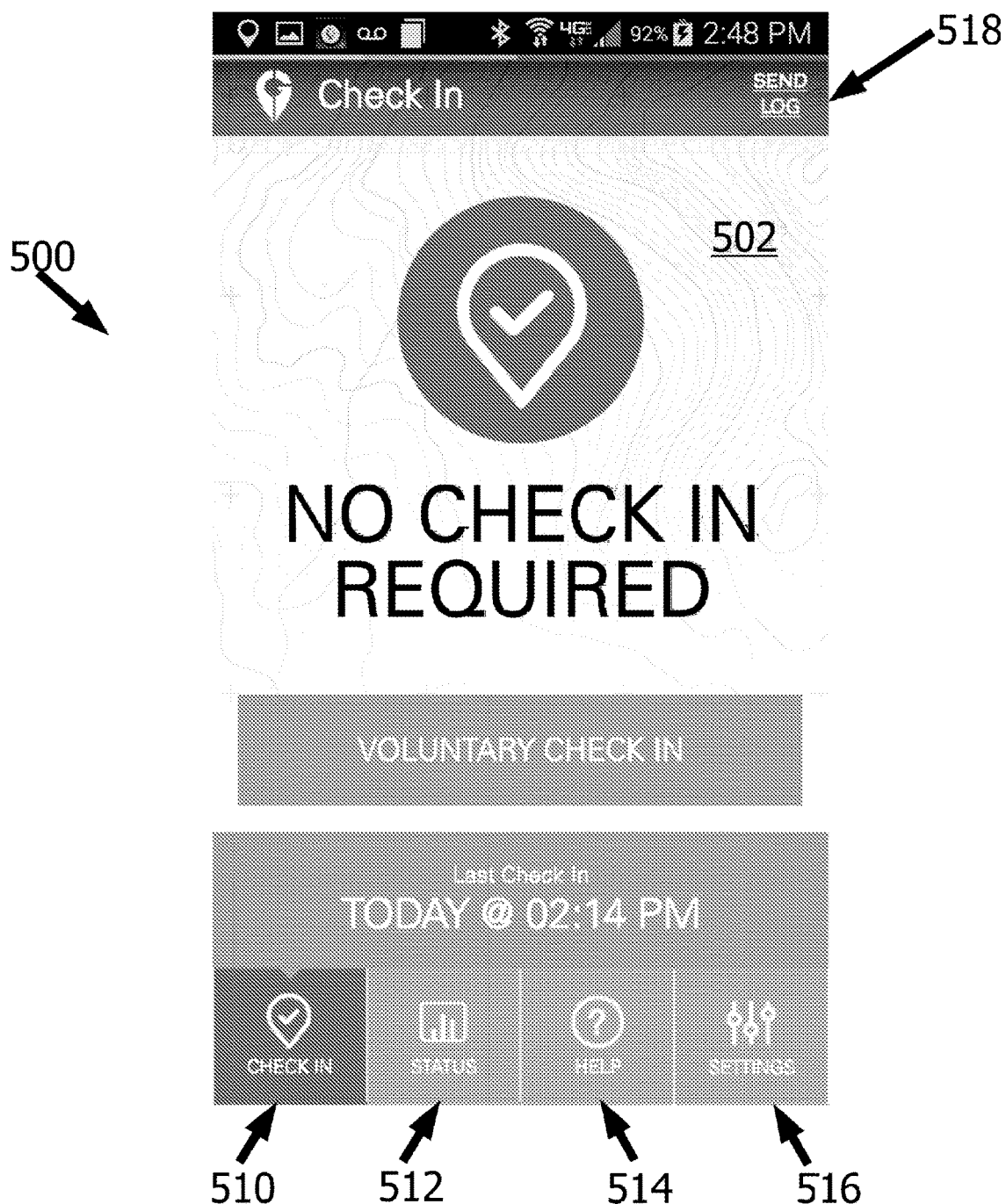
FIGS. 4-11 are example screenshots, of a mobile application, illustrating mobile device-based community corrections supervision system and method.

FIG. 4 is a screenshot 500 of an initial screen of an application, after login. Included is general status area 502, an option to perform a voluntary check-in 506. Screenshot 500 also includes button 510 to indicate a status of a last check-in, a status button 514, a settings button 516 and a send log function 518 which includes information on each check-in that has occurred. It should be noted upon an initial login, the last check-in status section 508 will typically not contain information about a last check-in as none have been performed at that point.

Figure 5:
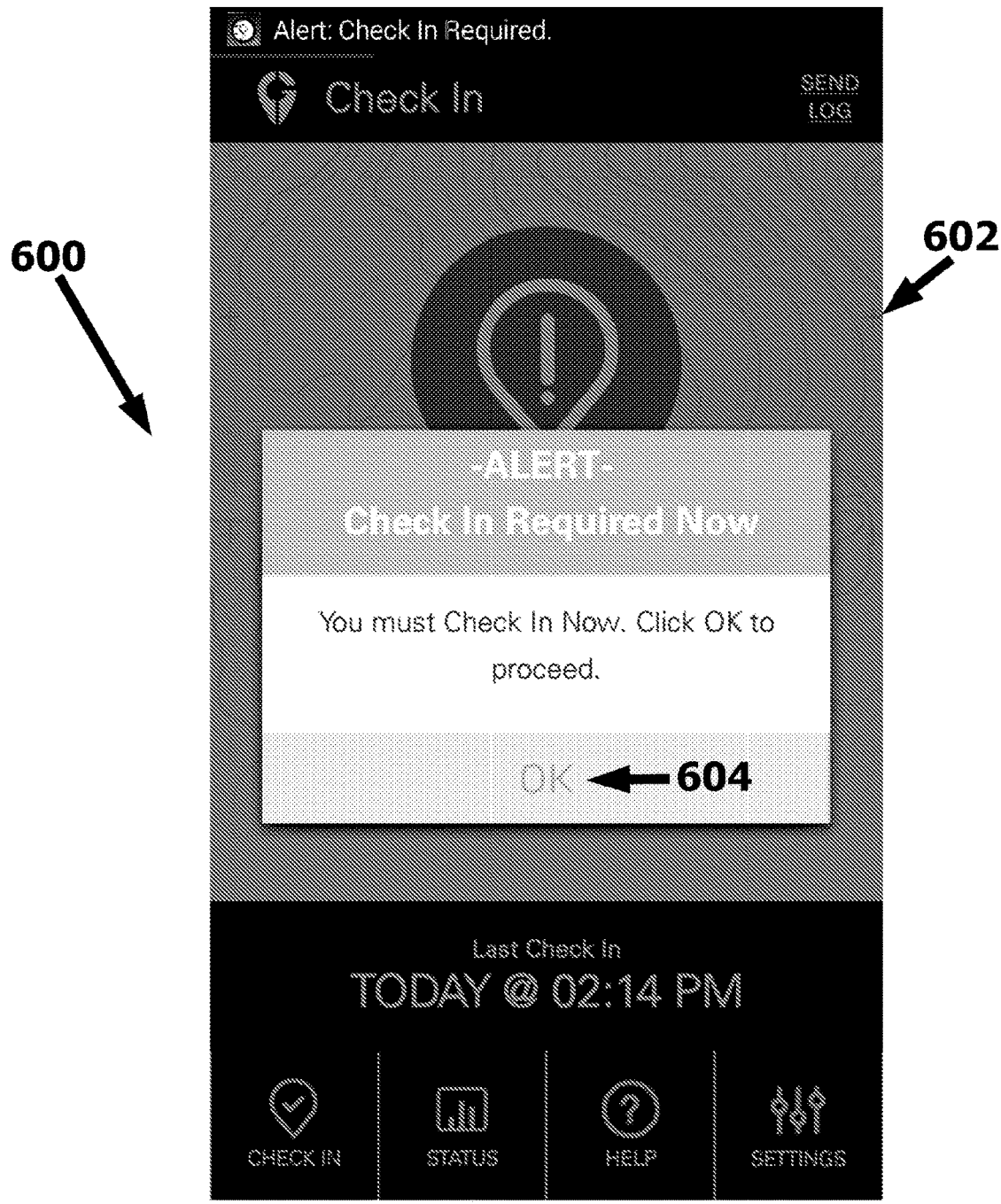
Figure 6:
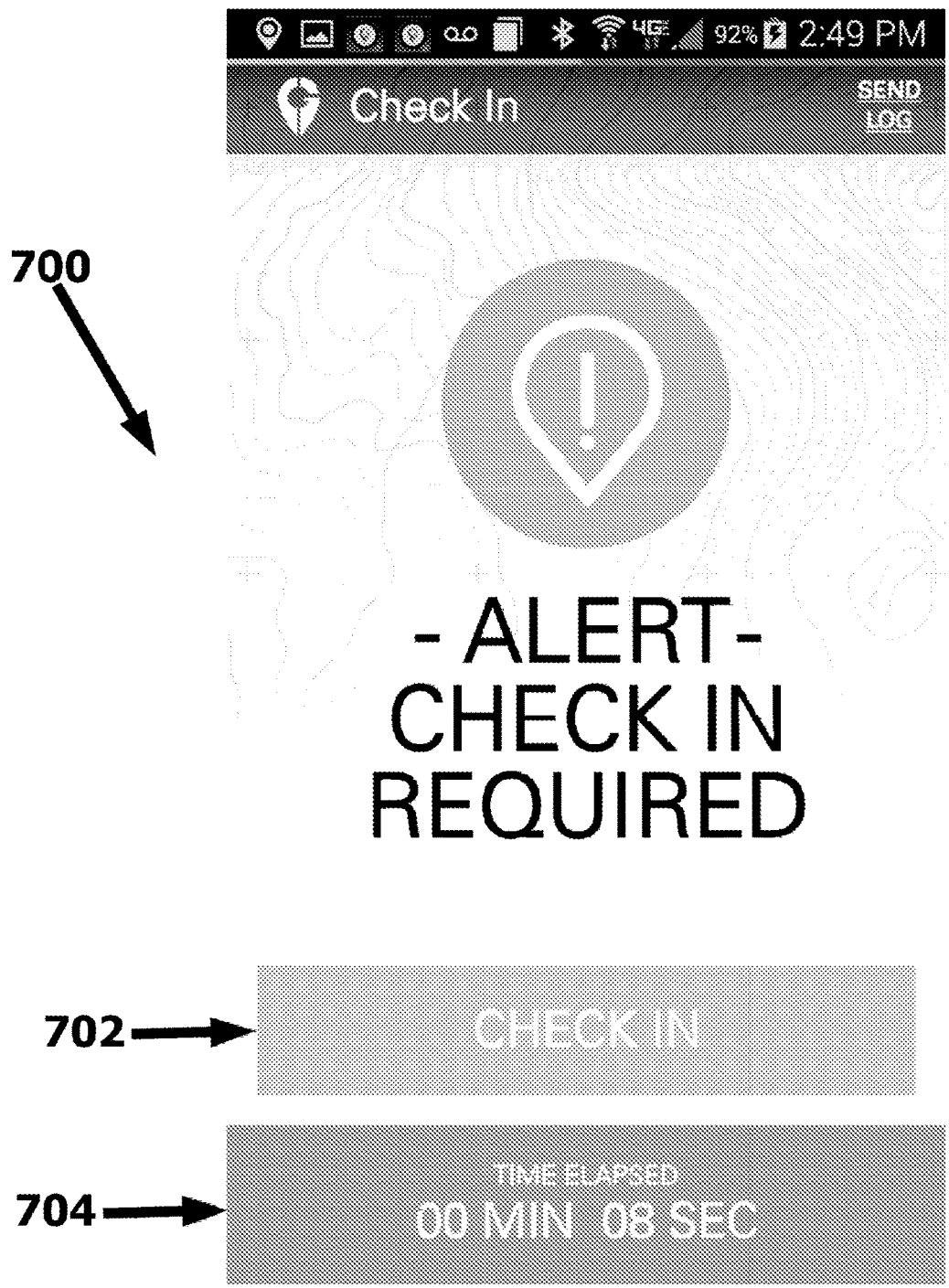

FIG. 5 is a screenshot 600 illustrating a required check-in alert 602. To execute the check-in, an enrollee clicks on "OK" button 604 and then initiates the next step by pressing the "check-in" button 702 of screenshot 700. It should be understood that while some claimed embodiments may refer to some check-ins as "required," it should be understood that there are implementations that may not employ "required" check-ins. Re-stated, the claimed embodiments may be practiced with required check-ins or with them not being required. One example of a unrequired check-in is a voluntary check-in whose typical use will be later be described.

Typically, an enrollee may be alerted that it is time to execute the required check-in via one or more audio alerts, buzzers, on-screen indicators, additional text message reminders and/or similar. Additionally, each of the aforementioned mechanisms may be also be used in various combinations thereof. Also, screenshot 604 will typically be the initial screen an enrollee after becoming aware of a check-in via an alert. Also of note in screenshot 700, is a time-elapsed section 704 which indicates how long it has been since the check-in popped up on the display 73 of device 59. Additional alerts may also be utilized to indicate to the enrollee when a battery remaining power level falls below a certain level, when and when a wireless connection signal strength falls below a certain level. Both of these alerts may be utilized by an enrollee to perhaps take action to ensure that a required check-in is not missed due to a depleted battery or being in an area of low signal strength. A potential remedy for a battery alert would be to re-charge the battery or perhaps put in different battery that has enough remaining power. Regarding the low signal strength alert, a remedy could include utilizing a nearby wireless data connection or perhaps moving to a location with better mobile data coverage.

Figure 7:
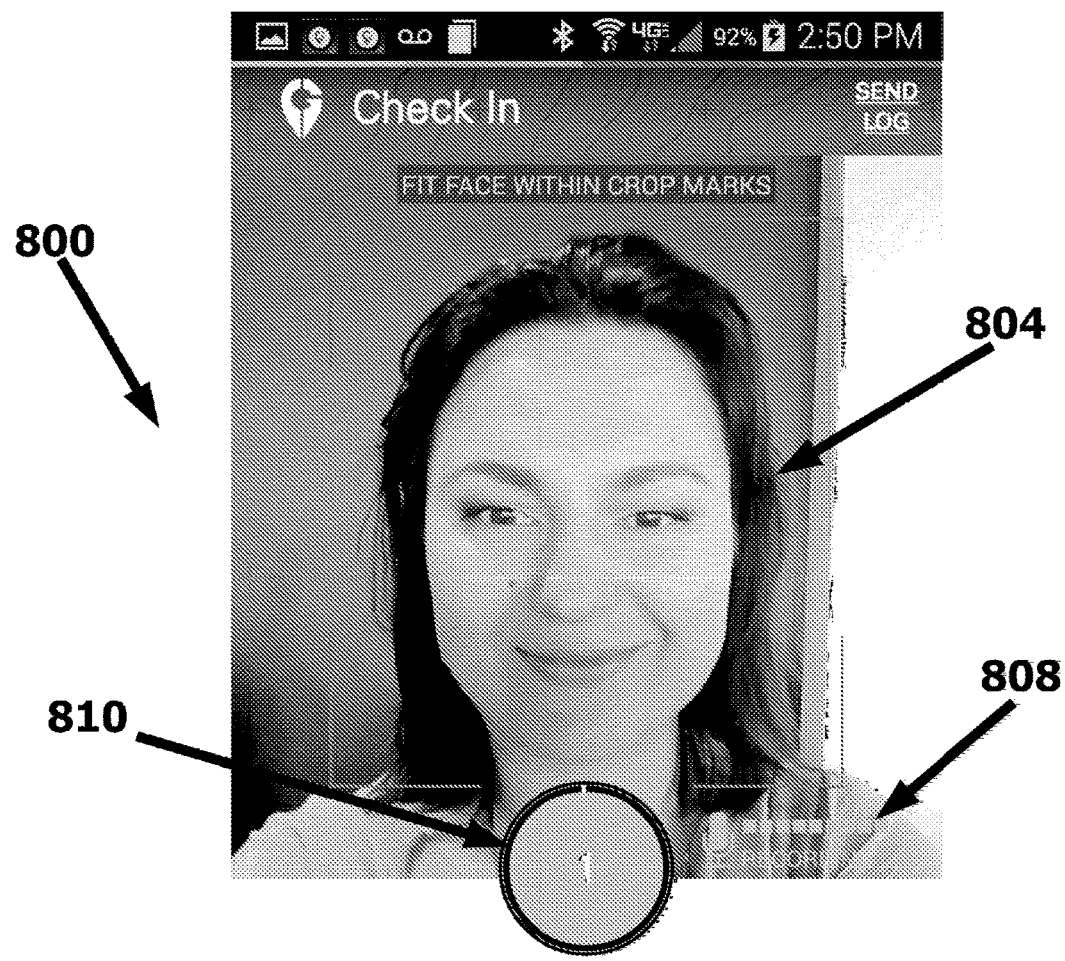
Figure 8:
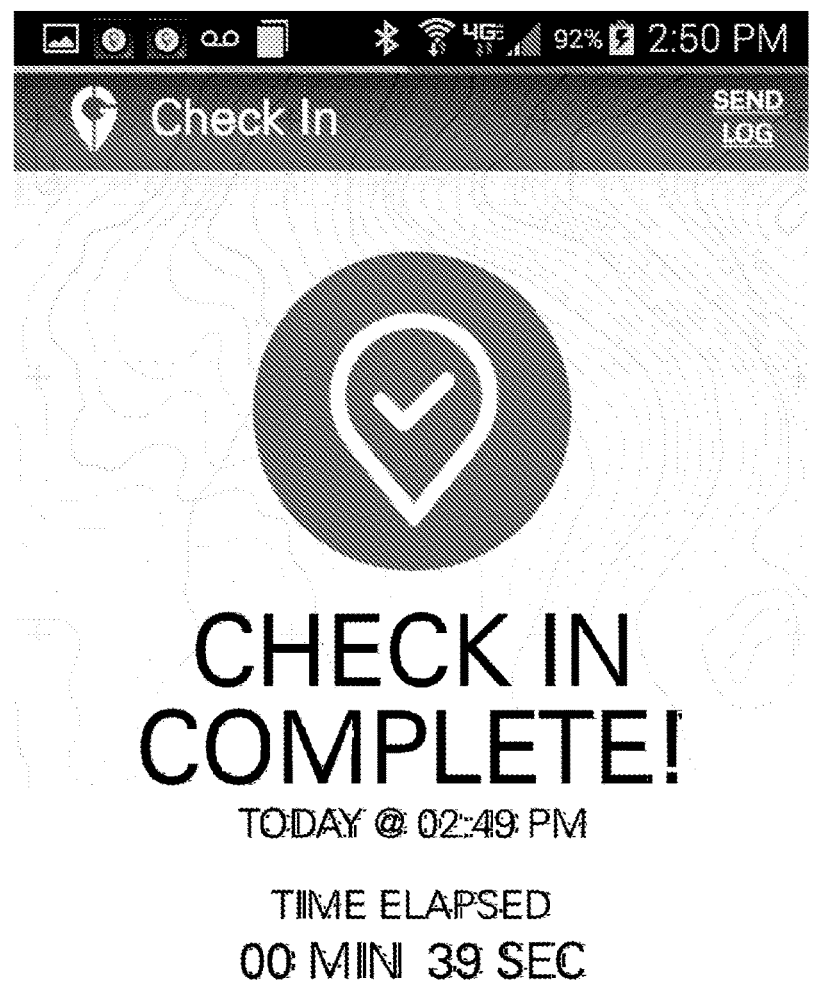
Figure 8:

Screenshot 800 of FIG. 7 illustrates the next part of check-in. Specifically, the enrollee places their device 59 such that the device's camera (camera lens and sensor 80) view shows the enrollee's face 802 on display 73. If the enrollee's face is not within the camera view then the enrollee is requested to do so. The enrollee is also required to recite displayed text 806 which may be a series of numbers, letters, words and combinations thereof. If no audio is detected, the enrollee may be prompted to repeat the displayed text 806. To that end, sound meter 808 provides a visual aid for the enrollee to know if they are speaking loudly enough. The enrollee is typically recorded during the recitation in that one or more pictures are taken of enrollee as the text is recited and the audio of the recitation is also recorded. Screenshot 800 may also include a countdown 810 in which the enrollee is allowed complete the text recitation. Once the countdown 810 expires, screenshot 900 will typically be shown to indicate that the check-in has been completed, time of completion as well as how long it took to complete the check-in (time from first alert to completion of check-in, in some implementations). In some implementations, an enrollee may be allowed a pre-defined amount of time to complete the check-in.

Figure 9:
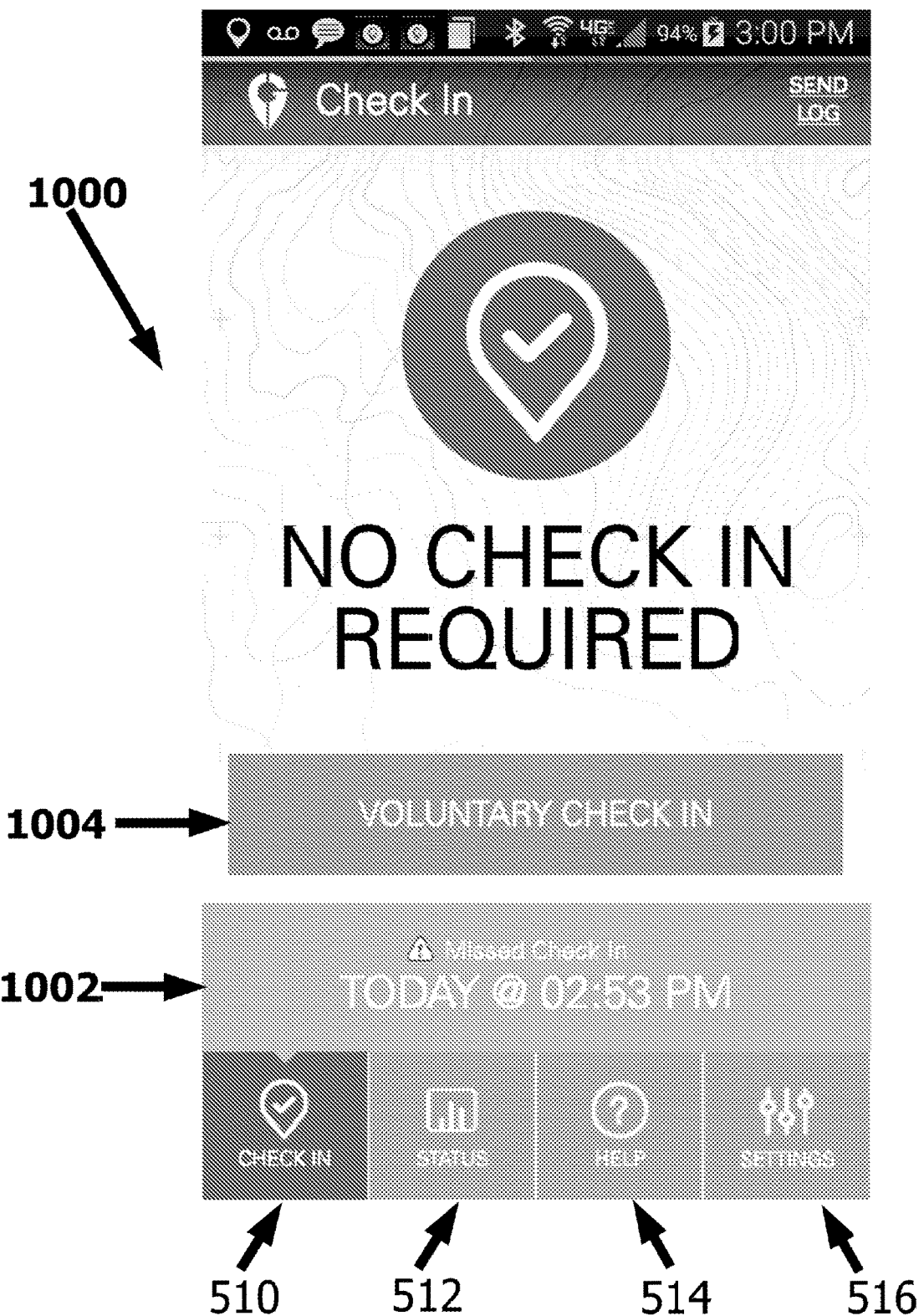

If the pre-defined amount of time expires and the required check-in has not been completed, it may deemed to be a missed check-in and may be indicated via section 902 of screenshot 1000 of FIG. 9. FIG. 9 also includes an option to perform a voluntary check-in via button 904. Voluntary check-ins may be performed at any time by an enrollee except when a check-in is required to be performed. Execution of a voluntary check-in, soon after a missed check-in occurs, may be viewed favorably by an enrollee's case manager.

Figure 10:
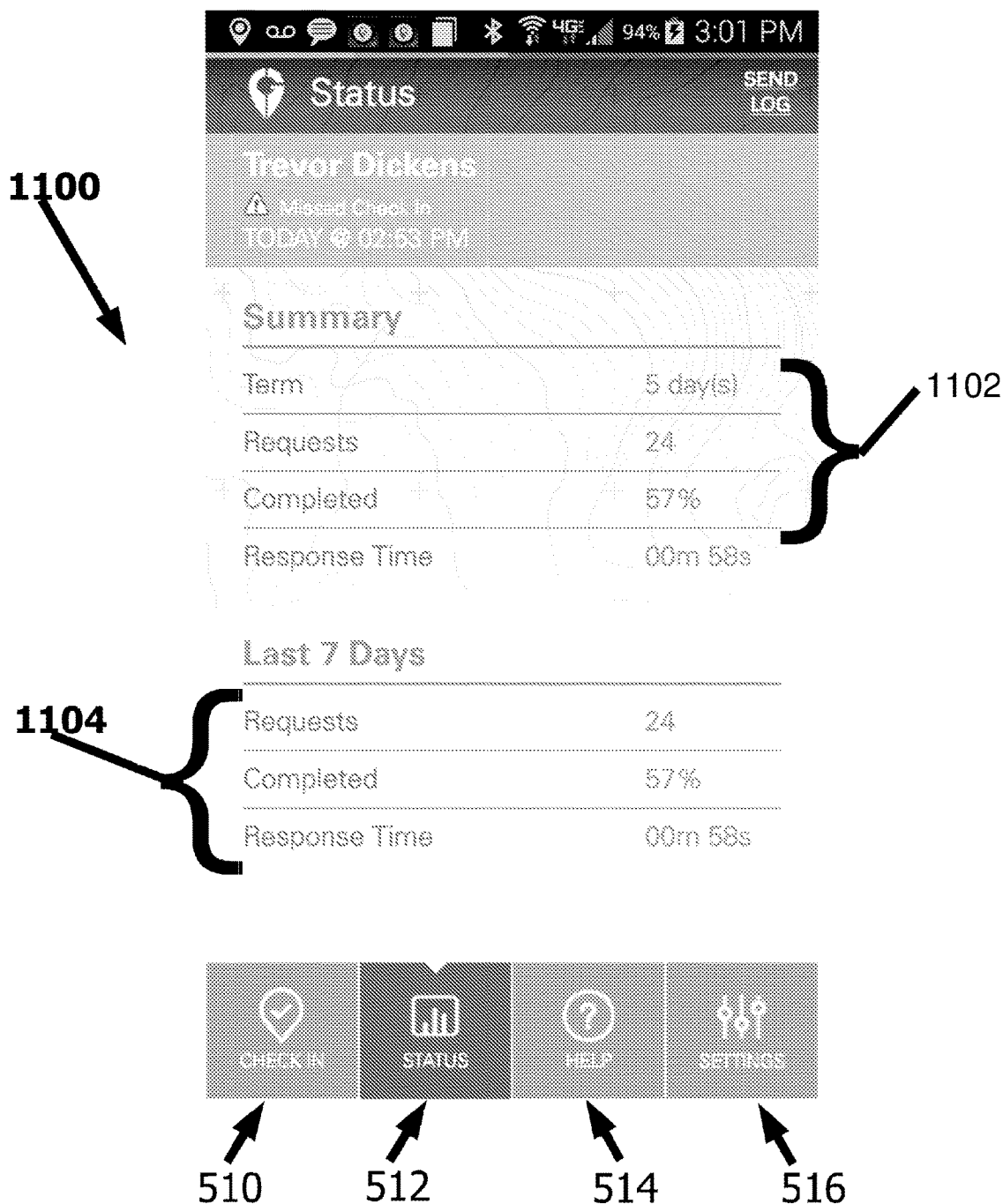

FIG. 10 includes a screenshot 1100 which shows statistical categories when the aforementioned status button 512 is selected. Status, in the implementation of FIG. 10 includes a summary section 1102 and a last 7 days section 1104. Summary section 1102 will typically include the term or length of time the enrollee may be subject to supervision, a number of check-ins to date, what percentage was completed successfully as well as an average response time. Average response time may be total time to complete a check-in in some implementations or perhaps an average elapsed time before a responding to a check-in occurs, after an initial check-in alert is initiated, in other implementations. The last 7 days section 1104 includes data that covers the previous week. If an enrollee has been under supervision for less than a week, then sections 1102 and 1104 will display identical numbers for number of requests, completed requested requests and average response time as both sections are reporting on a same set of data. After a 7$^{th}$ day of supervision, the two sets of numbers will typically diverge. Restated, the last 7 days section 1104 will cover a prior week's performance while the summary will be reflective of overall term performance. This can be useful to the enrollee in that it can indicate improvement over past performance, a decrease in performance or perhaps steady performance, be it poor performance, ok performance or good performance. An indication of steady poor to ok performance could also be taken as a signal to try to improve one's compliance their supervisee requirements.

Figure 11:
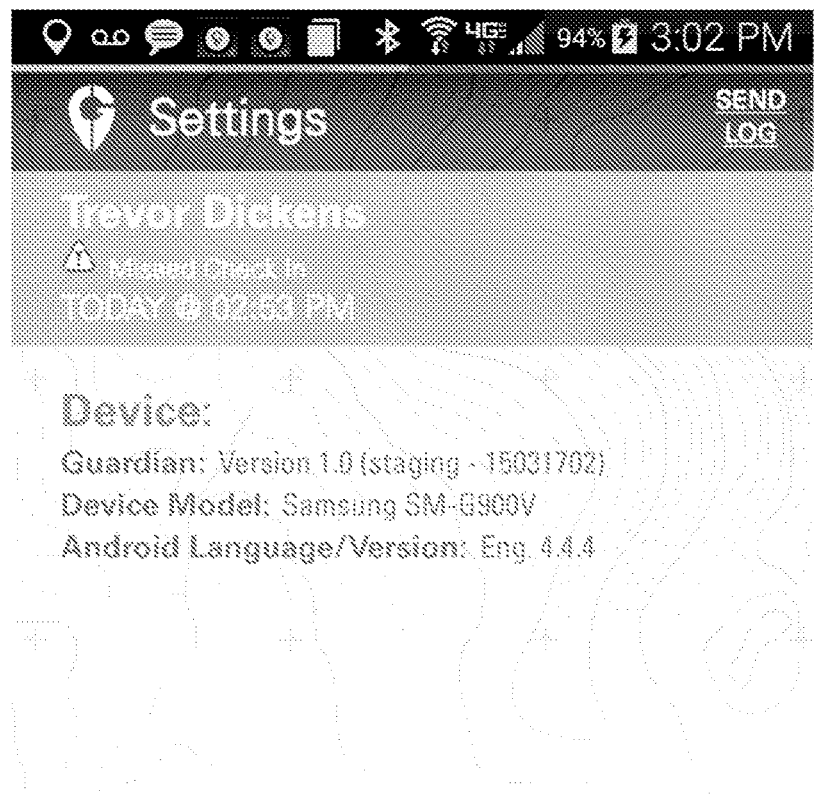
Figure 11:
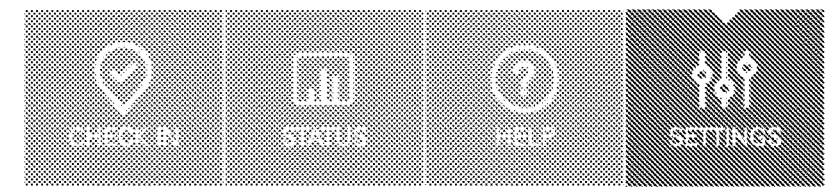

FIG. 11 includes a screenshot 1200 that shows an example set of information that could be displayed when settings button 516 is selected. In this particular example, information on a version of the application is included, a mobile device model number and an operating system version number. While these may not be 'adjustable,' settings that may be configurable by the enrollee could be implemented. Examples may include preferred font, preferred font size and preferred font color. Further examples may include preferred application schemes such as a choices of pre-configured color combinations and/or perhaps customizable options.

Figure 12:
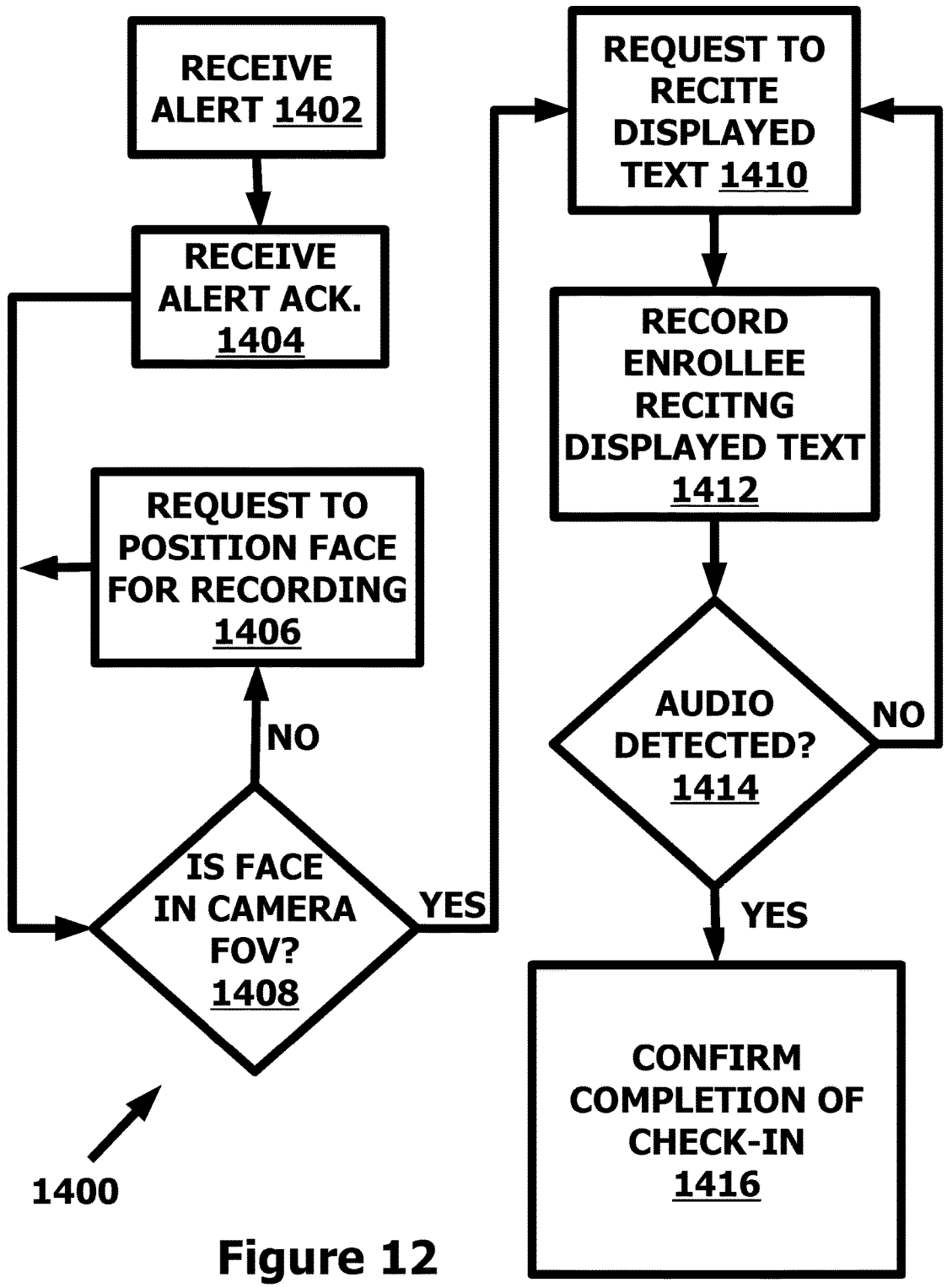
FIG. 12 is a flowchart illustrating a method for a mobile device-based community corrections supervision system, in accordance with the claimed embodiments.

FIG. 12 is a flowchart diagram illustrating a method 1400 for a mobile device check-in, generally reflective of the preceding FIGS. 4-11. Method 1400 will typically be executed by a processor of a mobile device such as processor 2204 of FIG. 2. Initially, the processor 2204 receives an alert that a check-in is required, via operation 1402, and will then typically receive a check-in alert acknowledgement, from the enrollee, via operation 1404. Next, processor 2204 determines if the enrollee's face is in the camera view (1408). If not, processor 2204 requests the enrollee to do so (1406) and in turn, upon detecting the face in the camera view (1408) requests the enrollee to receipt the displayed text (1410) and records (take one or more pictures and record audio) the enrollee (1412). If no audio is detected (1414), processor 2204 re-requests recitation of the displayed text (1410). If audio is detected, the processor 2204 signals (1416) that a successful check-in has been completed.

Another aspect of the claimed embodiments provide for a case manager application used to enroll new enrollees in the supervision system, select their term and type of supervision program as well as monitor performance of current new and current enrollees. Such an application may be implemented via the computer system 400 of FIG. 3. FIGS. 13-21 are screenshots that illustrate basic functionality of a specific implementation of this type of application.

Figure 13:
Figure 14:
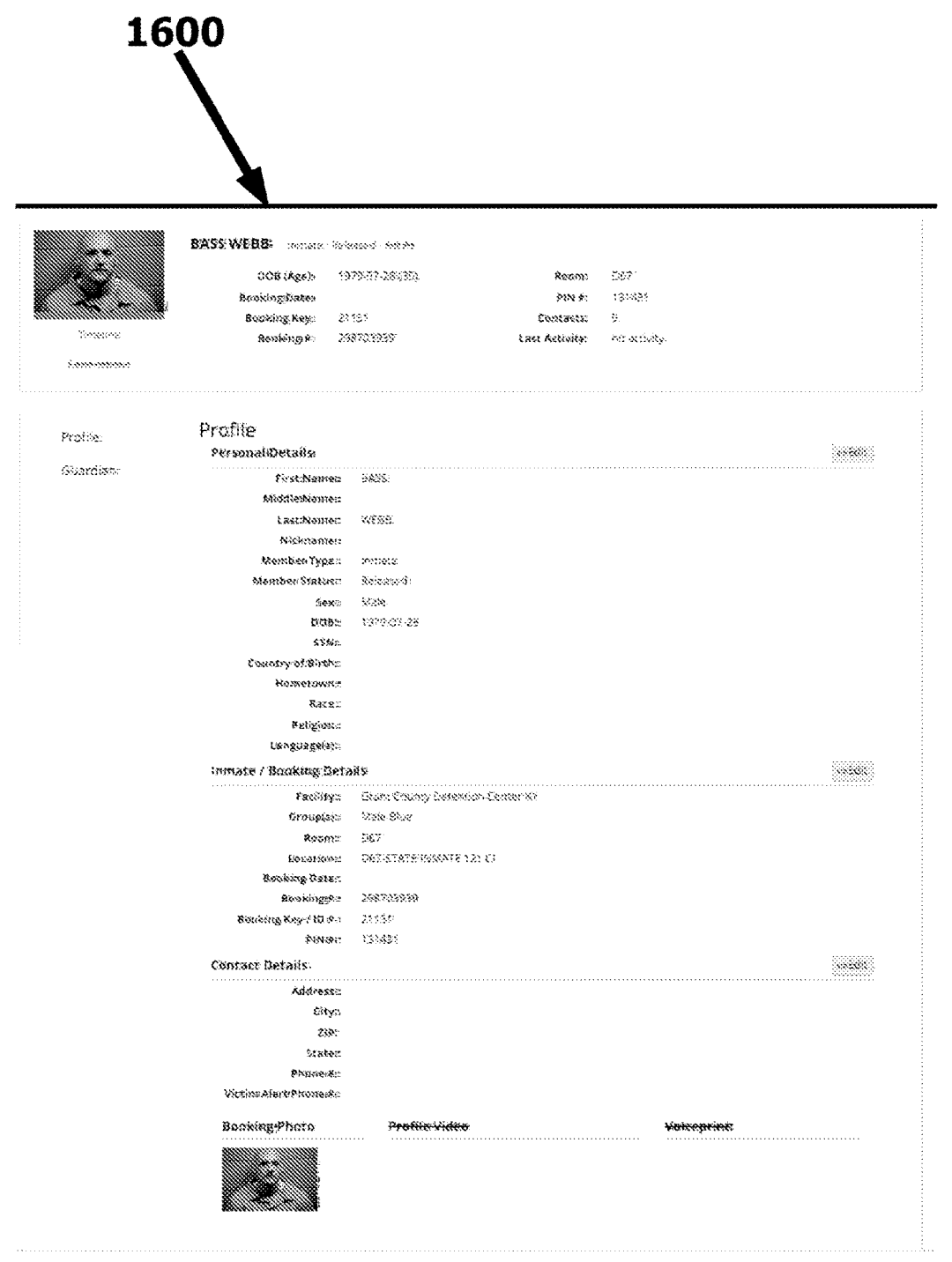

Beginning with FIG. 13, FIG. 13 depicts a screenshot 1500 of names previously entered into a system such as a bail booking system or inmate tracking system. Either situation or perhaps even a new entry could be utilized to enroll a person into supervision system of the claimed embodiments. Selection of a name, for example Bass Webb, may yield a detailed page of personal information, such as screenshot 1600 of FIG. 14 and shows information that may typically be recorded about an enrollee.

Figure 15:
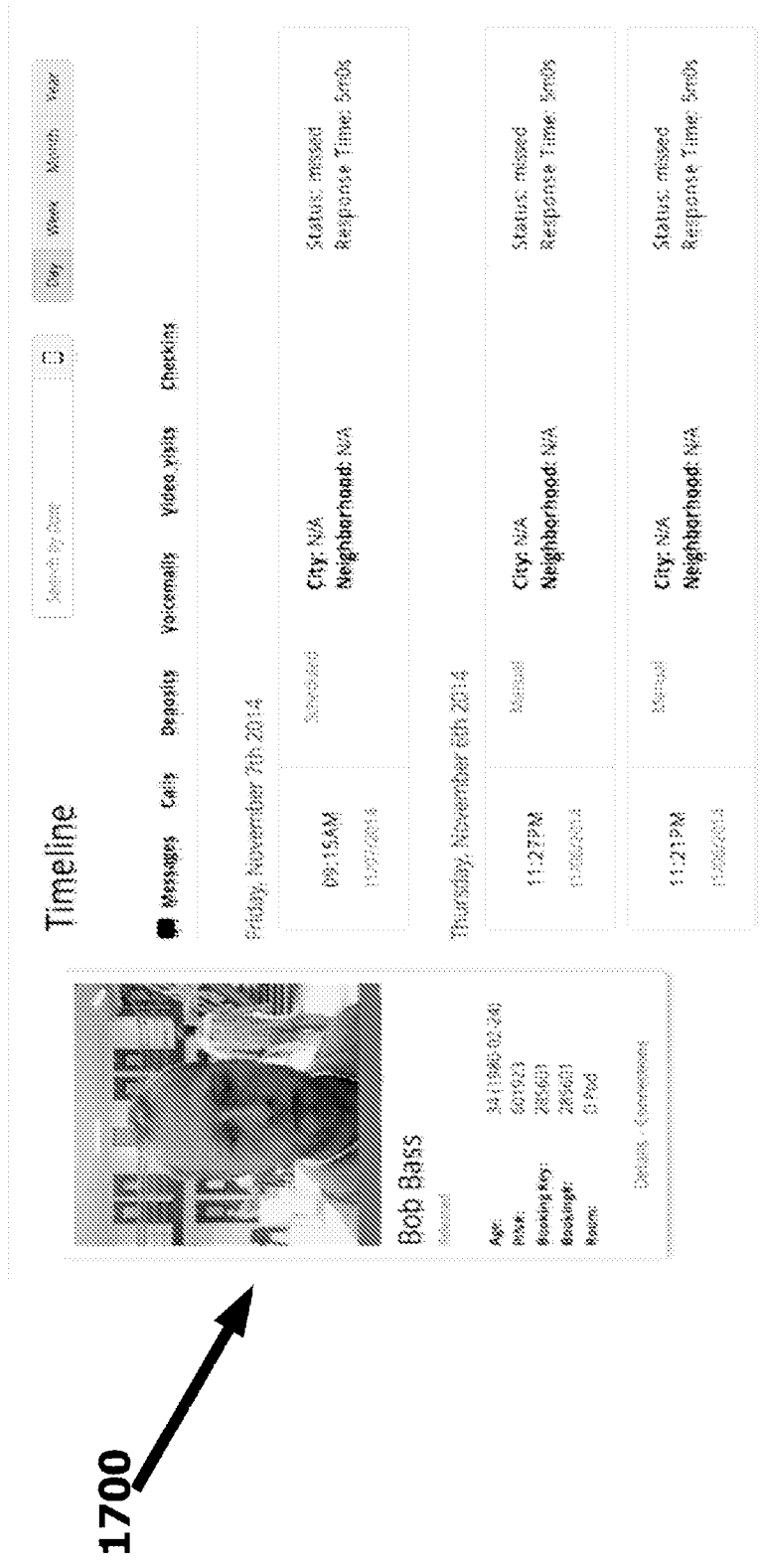
Figure 20:
Figure 21:
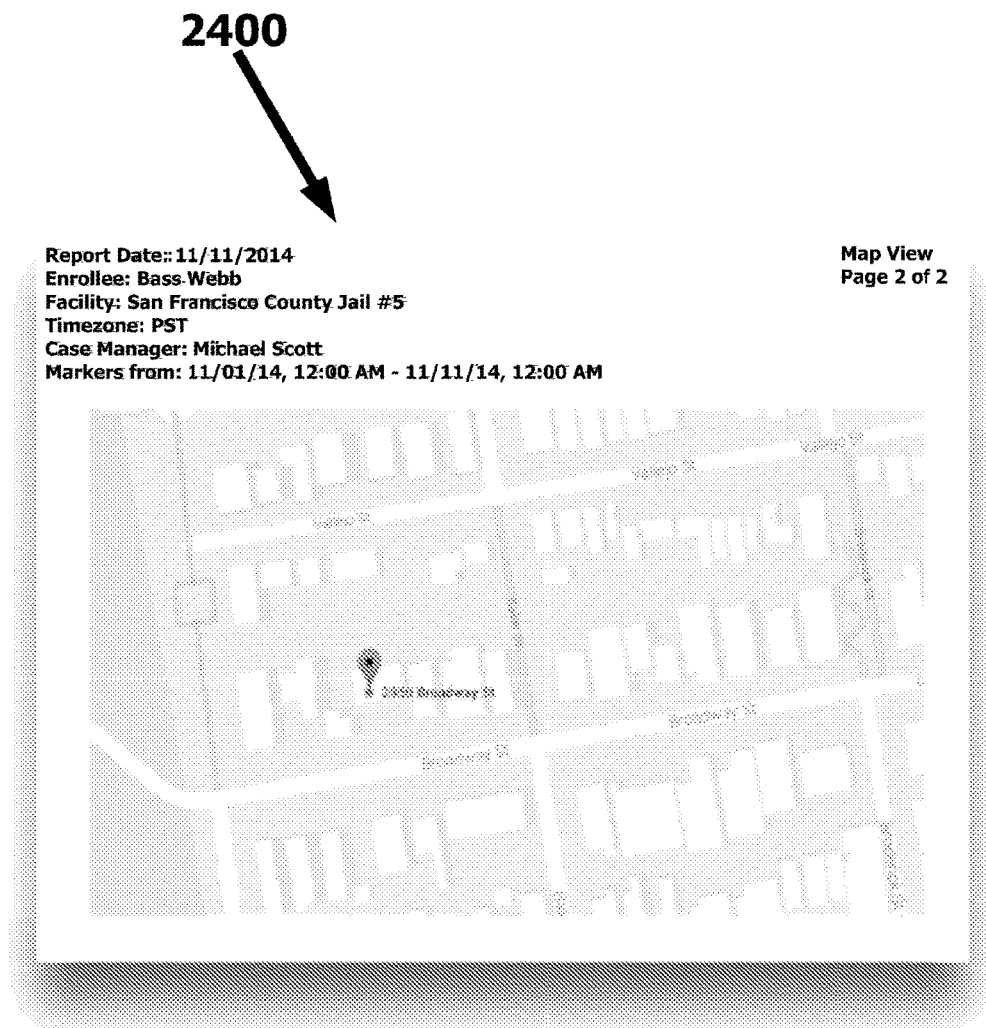

The application may also be capable of showing a check-in history timeline, after a person has been enrolled, such as a timeline depicted via screenshot 1700 of FIG. 15.

Figure 16:
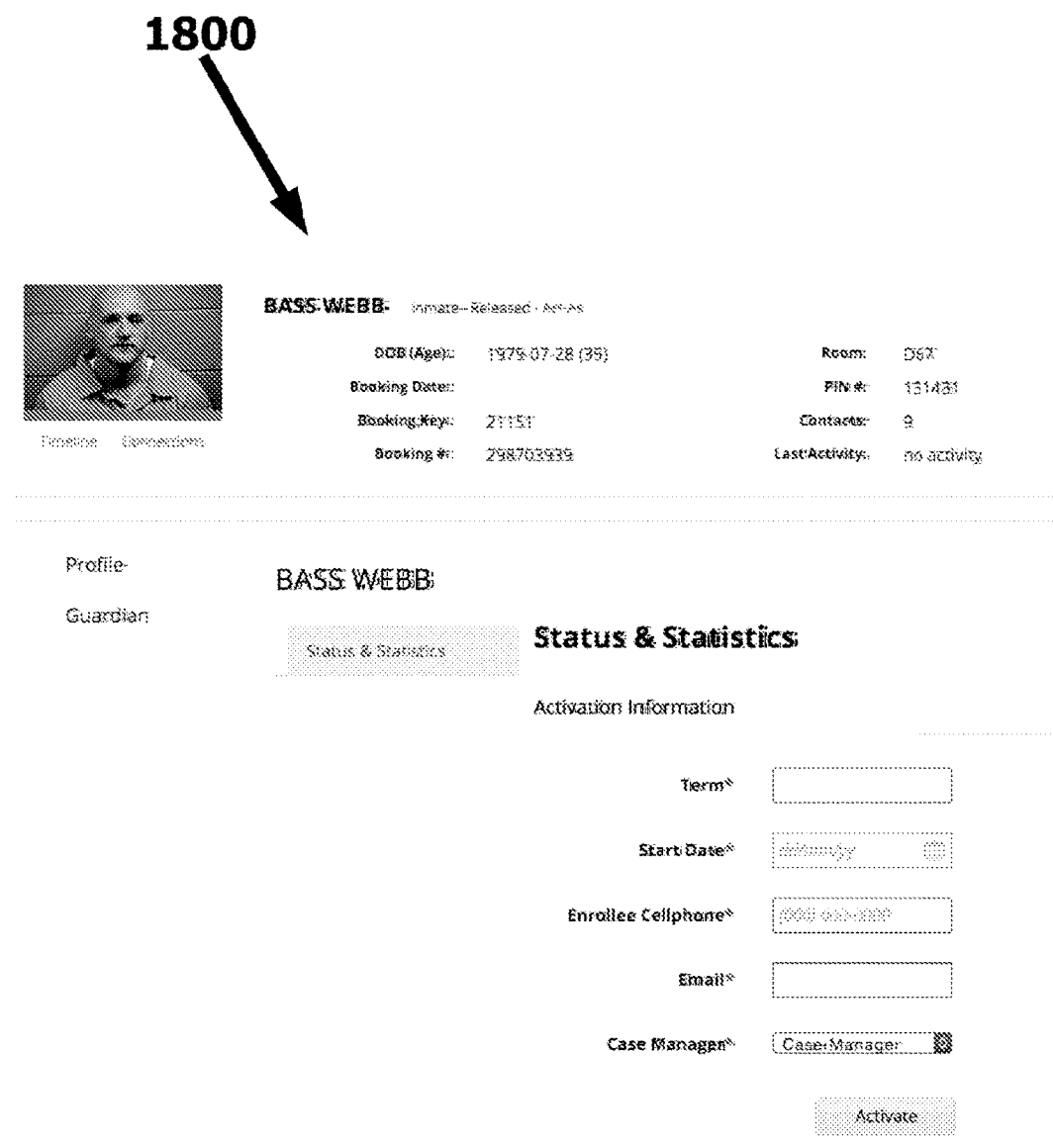

Screenshot 1800, of FIG. 16, shows an example new enrollee enrollment-page and includes selection of term length, term start date, enrollee's mobile device number, email address as well as assigned case manager.

Figure 17:
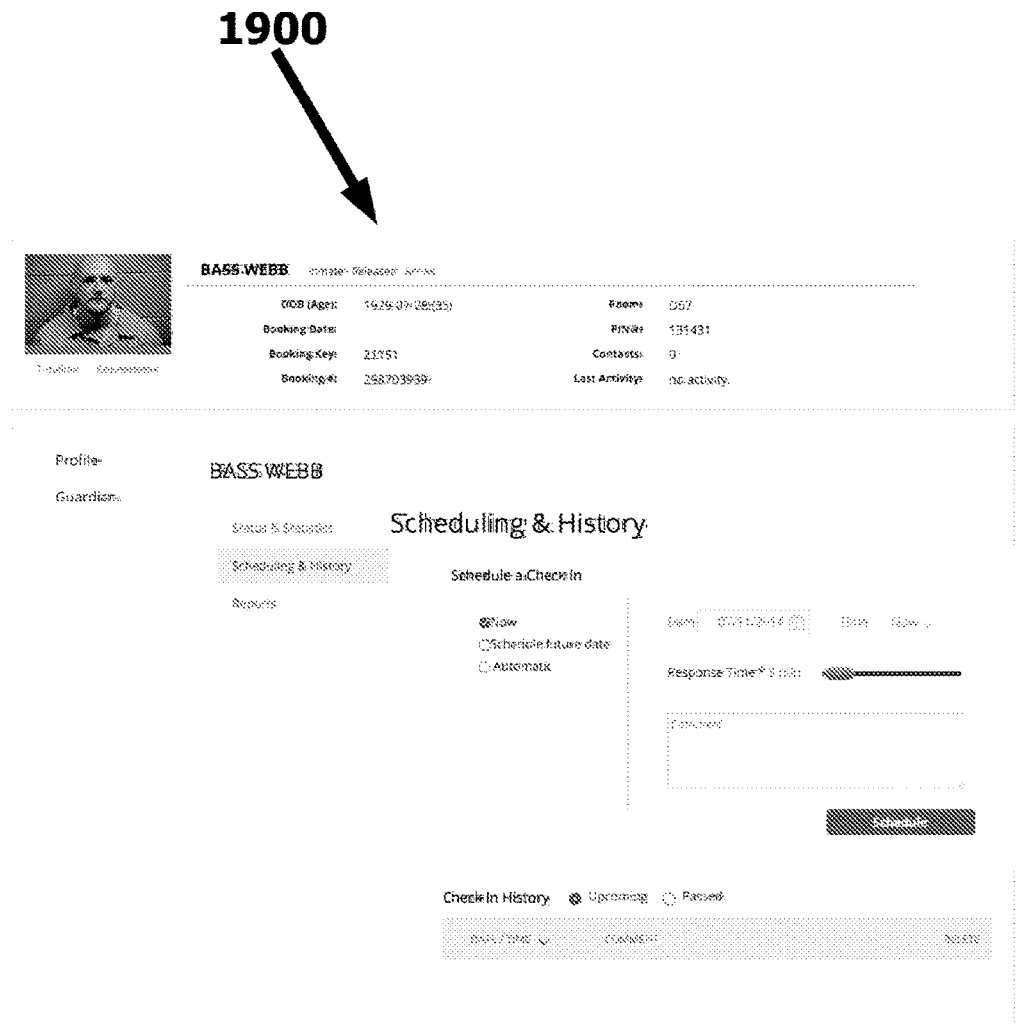
Figure 18:
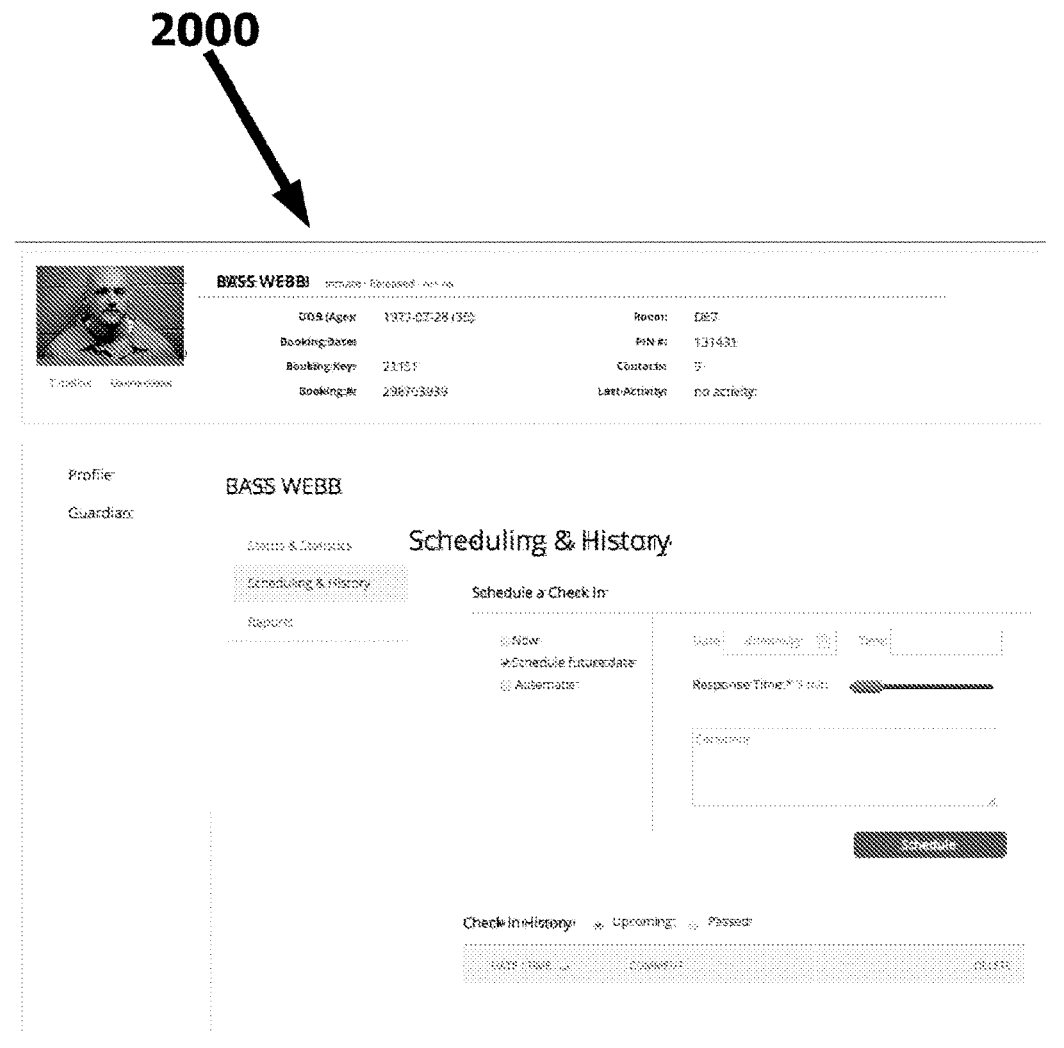
Figure 19:
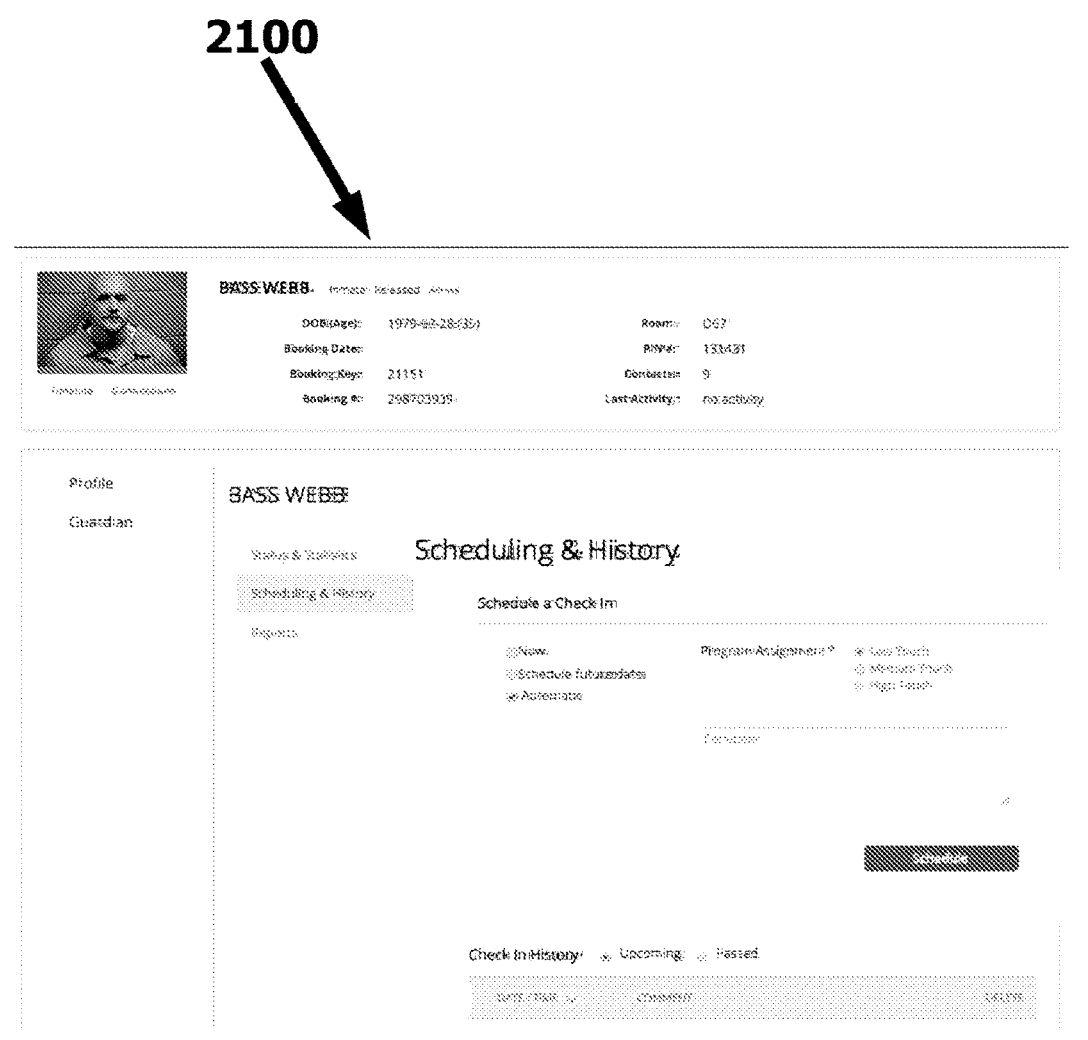

Screenshots 1900, 2000 and 2100, of FIGS. 17-19 each illustrates options for sending a check-in request to an enrollee. FIG. 17/screenshot 1900 illustrates an immediate/now check-in request. FIG. 18/screenshot 2000 illustrates an option to schedule future check-in request and FIG. 19/screenshot 2100 automatic, random scheduling of check-ins at differing amounts of check-ins. Re-stated, a 'low touch' option will prescribe a lower amount of prescribed check-ins in comparison to the number of prescribed check-ins for a 'medium touch' option. Similarly, 'high touch' option provides for more check-ins than the medium touch. Also of note are options to as specify a response time for NOW and singularly-scheduled future check-ins. Such an option could also be provided for automatic check-in sentences as well but is not specifically configured for that option in FIG. 19. If it were, though, a selected response time would be employed for all of the automatically scheduled check-ins.

Another aspect of the claimed embodiments provide for intermittent GPS location recordation of an enrollee's mobile device during and in between checkin's. Such information may be used to monitor where an enrollee ventures as well as potentially enforcing any preferred geo-fencing restrictions such as not being allowed to venture to certain areas or perhaps not being allowed to enter or leave certain areas dependent upon a time of day. The case manager application may therefore provide for a GPS location report that includes recorded coordinates (latitude and longitude), timestamp, altitude and velocity such as shown on screenshot 2300 of FIG. 20. Selection of any specific entry may also provide map corresponding to the recorded location to help visualize the where component. An example of such a map is shown via screenshot 2400 of FIG. 21. Other implementations may include a compilation map of recorded GPS locations to ascertain an enrollee's movements over a specified time period.

If GPS location is not available, other location-determining methodologies may be employed such as utilizing, if available, cell tower triangulation or perhaps WiFi access point triangulation. Combinations thereof may also possibly be utilized such as GPS, cell tower and WiFi access point data all being used in conjunction to potentially determine a device's location. It should be noted that the claimed embodiments are not necessarily constrained to using these as-listed methodologies in that other method The claimed embodiments are not meant to be limited to only a probation/parole supervision-type of situation. They may also be utilized for pre-trial supervision purposes as opposed to pre-trial incarceration, when such situations may arrive. Additionally, successful compliance could also be taken into consideration if the enrollee is later sentenced.

Yet another embodiment may provide for certain types of enrollees to have their mobile device configured to give an early warning alert to users of third party Bluetooth devices when the enrollee comes within a Bluetooth-detectable range. One type of third party user could be underage school personnel in view of convicted child molesters out on parole but enrolled in a supervision system of the claimed embodiments.

While a number of exemplary aspects and embodiments have been discussed above, those of skill in the art will recognize certain modifications, permutations, additions and sub-combinations thereof. It is therefore intended that the following appended claims, and claims hereafter introduced, are interpreted to include all such modifications, permutations, additions and sub-combinations as are within their true spirit and scope.

The invention claimed is:

1. A method for providing a mobile device-based community corrections supervision system, comprising:
   receiving, by a mobile device of an enrollee and from a remote server, a first alert requiring the enrollee to perform a first check-in, wherein the enrollee is enrolled within the mobile device-based community corrections supervision system;
   performing, in response to the first alert, the first check-in by the enrollee on the mobile device of the enrollee; and
   transmitting the first check-in performed by the enrollee, from the mobile device of the enrollee to the remote server for monitoring by a supervision case manager assigned to the enrollee.

2. The method of claim 1, further comprising:
   receiving a first acknowledgement of the first alert from the enrollee;
   presenting, in response to receiving the first acknowledgement, a displayed text to the enrollee via a screen on the mobile device of the enrollee;
   requesting, after the presenting, the enrollee to recite the displayed text;
   recording, using a camera and a microphone on the mobile device of the enrollee, the enrollee reciting the displayed text to obtain a recordation; and
   transmitting the recordation to the remote server for monitoring by the supervision case manager assigned to the enrollee.

3. The method of claim 2, further comprising:
   prior to recording the enrollee reciting the displayed text:
   determining that a face of the enrollee is not within a camera view associated with the camera;
   prompting, based on the determining, the enrollee to position the mobile device of the enrollee such that the face of the enrollee is within the camera view; and
   determining, after a positioning of the mobile device of the enrollee, that the face of the enrollee is within the camera view.

4. The method of claim 2, further comprising: prior to transmitting the recordation:
   detecting, using the microphone, that no audio is being recorded;
   prompting, based on the detecting, the enrollee to re-recite the displayed text; and
   re-recording the enrollee re-reciting the displayed text.

5. The method of claim 2, further comprising:
   recording, using a global positioning system (GPS) receiver on the mobile device of the enrollee, a GPS location of the mobile device of the enrollee.

6. The method of claim 5, wherein the GPS location is recorded between receiving the first alert and receiving a second alert requiring the enrollee to perform a second check-in.

7. The method of claim 6, wherein the GPS location records the enrollee entering a disallowed geographic area.

8. The method of claim 7, further comprising:
   receiving, in response to the enrollee entering the disallowed geographic area, a third alert requiring the enrollee to perform a third check-in.

9. The method of claim 2, wherein the first acknowledgement of the first alert is not received within a pre-defined response period, wherein the first check-in is recorded as a missed check-in.

10. The method of claim 2, wherein the remote server sends the first alert to the mobile device of the enrollee automatically based on a random schedule.

11. The method of claim 2, wherein the first alert is manually initiated by the supervision case manager via the remote server.

12. The method of claim 2, further comprising:
    receiving, from the enrollee, a voluntary check-in after the first check-in is missed.

13. The method of claim 12, further comprising:
    prior to receiving the voluntary check-in:
    receiving, from the remote server, a second alert requiring the enrollee to perform a second check-in;
    receiving a second acknowledgement of the second alert from the enrollee;
    determining that the second acknowledgement has not been received within a pre-defined response period; and
    recording, based on the determining, the second check-in as a missed check-in.

14. The method of claim 2, wherein the first alert is received in response to a wireless connection signal strength of the mobile device of the enrollee falling below a threshold.

15. The method of claim 2, wherein the first alert is received in response to a battery remaining power level of the mobile device of the enrollee falling below a threshold.

16. The method of claim 2, wherein the enrollee is enrolled in the mobile device-based community corrections supervision system for parole-purposes.

17. The method of claim 2, wherein the enrollee is enrolled in the mobile device-based community corrections supervision system for probation-purposes.

18. The method of claim 2, wherein the enrollee is enrolled in the mobile device-based community corrections supervision system for pre-trial purposes.

19. The method of claim 18, wherein the enrollee is further enrolled in the mobile device-based community corrections supervision system as an option to pre-trial incarceration.

20. The method of claim 18, wherein an amount of time the enrollee participates in the mobile device-based community corrections supervision system is used at least in part for a later time-served sentence duration reduction.

21. A non-transitory computer-readable medium, for providing a mobile device-based community corrections supervision system, comprising executable instructions operative to cause at least one processor of a mobile device of an enrollee to:
 enroll the enrollee with the mobile device of the enrollee within the mobile device-based community corrections supervision system;
 receive, by the mobile device of the enrollee and from a remote server, a first alert requiring the enrollee to perform a first check-in on the mobile device of the enrollee;
 perform, in response to the first alert, the first check-in on the mobile device of the enrollee; and
 transmit the first check-in performed by the enrollee, from the mobile device of the enrollee to the remote server for monitoring by a supervision case manager assigned to the enrollee.

22. The non-transitory computer-readable medium of claim 21, further comprising the executable instructions operative to cause at least one processor of a mobile device of an enrollee to:
 receive a first acknowledgement of the first alert from the enrollee;
 present, in response to receiving the first acknowledgement, a displayed text to the enrollee via a screen on the mobile device of the enrollee;
 request, after the presenting, the enrollee to recite the displayed text;
 record, using a camera and a microphone on the mobile device of the enrollee, the enrollee reciting the displayed text to obtain a recordation; and
 transmit the recordation to the remote server for monitoring by the supervision case manager assigned to the enrollee.

23. The non-transitory computer-readable medium of claim 22, further comprising executable instructions operative to cause the at least one processor of the mobile device of the enrollee to:
 record, using a global positioning system (GPS) receiver on the mobile device of the enrollee, a GPS location of the mobile device of the enrollee.

24. The non-transitory computer-readable medium of claim 23, wherein the GPS location is recorded between receiving the first alert and receiving a second alert requiring the enrollee to perform a second check-in.

25. The non-transitory computer-readable medium of claim 24, wherein the GPS location records the enrollee entering a disallowed geographic area.

26. The non-transitory computer-readable medium of claim 25, further comprising executable instructions operative to cause the at least one processor of the mobile device of the enrollee to:
 receive, in response to the enrollee entering the disallowed geographic area, a third alert requiring the enrollee to perform a third check-in.

27. The non-transitory computer-readable medium of claim 22, wherein the first acknowledgement of the first alert is not received within a pre-defined response period, wherein the first check-in is recorded as a missed check-in.

28. The non-transitory computer-readable medium of claim 22, wherein the remote server sends the first alert to the mobile device of the enrollee automatically based on a random schedule.

29. The non-transitory computer-readable medium of claim 28, wherein the first alert is manually initiated by the supervision case manager via the remote server.

30. The non-transitory computer-readable medium of claim 22, further comprising executable instructions operative to cause the at least one processor of the mobile device of the enrollee to:
 receive, from the enrollee, a voluntary check-in after the first check-in is missed.

31. The non-transitory computer-readable medium of claim 30, further comprising executable instructions operative to cause the at least one processor of the mobile device of the enrollee to:
 prior to receiving the voluntary check-in:
  receive, from the remote server, a second alert requiring the enrollee to perform a second check-in;
  receive a second acknowledgement of the second alert from the enrollee;
  determine that the second acknowledgement has not been received within a pre-defined response period; and
  record, based on the determining, the second check-in as a missed check-in.

32. The non-transitory computer-readable medium of claim 22, wherein the first alert is received in response to a wireless connection signal strength of the mobile device of the enrollee falling below a threshold.

33. The non-transitory computer-readable medium of claim 22, wherein the first alert is received in response to a battery remaining power level of the mobile device of the enrollee falling below a threshold.

34. The non-transitory computer-readable medium of claim 22, wherein the enrollee is enrolled in the mobile device-based community corrections supervision system for parole-purposes.

35. The non-transitory computer readable medium of claim 22, wherein the enrollee is enrolled in the mobile device-based community corrections supervision system for probation-purposes.

36. The non-transitory computer-readable medium of claim 22, wherein the enrollee is enrolled in the mobile device-based community corrections supervision system for pre-trial purposes.

37. The non-transitory computer-readable medium of claim 36, wherein the enrollee is further enrolled in the mobile device-based community corrections supervision system as an option to pre-trial incarceration.

38. The non-transitory computer-readable medium of claim 37, wherein an amount of time the enrollee participates in the mobile device-based community corrections supervision system is used at least in part for a later time-served sentence duration reduction.

39. An apparatus for providing a mobile device-based community corrections supervision system, comprising:
 at least one processor;
 at least one network interface;
 a memory;
 a screen;
 a camera;
 a microphone; and a software application, physically stored in the memory, comprising instructions operable to cause the at least one processor to:

enroll an enrollee with a mobile device of the enrollee within the mobile device-based community corrections supervision system;

receive, by the mobile device of the enrollee using the at least one network interface and from a remote server, a first alert requiring the enrollee, to which the apparatus belongs, to perform a first check-in on the mobile device of the enrollee;

perform, in response to the first alert, the first check-in on the mobile device of the enrollee; and transmit the first check-in performed by the enrollee, from the mobile device of the enrollee to the remote server for monitoring by a supervision case manager assigned to the enrollee.

40. The apparatus of claim 39, wherein the software application further comprises instructions operable to cause the at least one processor to:

receive a first acknowledgement of the first alert from the enrollee;

present, in response to receiving the first acknowledgment, a displayed text to the enrollee via the screen;

request, after the presenting, the enrollee to recite the displayed text;

record, using the camera and the microphone, the enrollee reciting the displayed text to obtain a recordation; and transmit, using the at least one network interface, the recordation to the remote server for monitoring by a supervision case manager assigned to the enrollee.

41. The apparatus of claim 40, further comprising: a global positioning system (GPS) receiver, wherein the software application further comprises instructions operable to cause the at least one processor to:

record, using the GPS receiver, a GPS location of the apparatus.

42. The apparatus of claim 41, wherein the GPS location is recorded between receiving the first alert and receiving a second alert requiring the enrollee to perform a second check-in.

43. The apparatus of claim 42, wherein the GPS location records the enrollee entering a disallowed geographic area.

44. The apparatus of claim 43, wherein the software application further comprises instructions operable to cause the at least one processor to:

receive, in response to the enrollee entering the disallowed geographic area, a third alert requiring the enrollee to perform a third check-in.

45. The apparatus of claim 40, wherein the first acknowledgement of the first alert is not received within a pre-defined response period, wherein the first check-in is recorded as a missed check-in.

46. The apparatus of claim 40, wherein the remote server sends the first alert to the apparatus automatically based on a random schedule.

47. The apparatus of claim 40, wherein the first alert is manually initiated by the supervision case manager via the remote server.

48. The apparatus of claim 40, wherein the software application further comprises instructions operable to cause the at least one processor to:

receive, from the enrollee, a voluntary check-in after the first check-in is missed.

49. The apparatus of claim 47, wherein the software application further comprises instructions operable to cause the at least one processor to:

prior to receiving the voluntary check-in:

receive, from the remote server, a second alert requiring the enrollee to perform a second check-in;

receive a second acknowledgement of the second alert from the enrollee;

determine that the second acknowledgement has not been received within a pre-defined response period; and record, based on the determining, the second check-in as a missed check-in.

50. The apparatus of claim 40, wherein the first alert is received in response to a wireless connection signal strength of the apparatus falling below a threshold.

51. The apparatus of claim 40, wherein the first alert is received in response to a battery remaining power level of the apparatus falling below a threshold.

52. The apparatus of claim 40, wherein the enrollee is enrolled in the mobile device-based community corrections supervision system for parole-purposes.

53. The apparatus of claim 40, wherein the enrollee is enrolled in the mobile device-based community corrections supervision system for probation-purposes.

54. The apparatus of claim 40, wherein the enrollee is enrolled in the mobile device-based community corrections supervision system for pre-trial purposes.

55. The apparatus of claim 54, wherein the enrollee is further enrolled in the mobile device-based community corrections supervision system as an option to pre-trial incarceration.

56. The apparatus of claim 54, wherein an amount of time the enrollee participates in the mobile device-based corrections supervision system is used at least in part for a later time-served sentence duration reduction.

* * * * *